US006493497B1

(12) United States Patent
Ramdani et al.

(10) Patent No.: US 6,493,497 B1
(45) Date of Patent: Dec. 10, 2002

(54) ELECTRO-OPTIC STRUCTURE AND PROCESS FOR FABRICATING SAME

(75) Inventors: Jamal Ramdani, Gilbert; Lyndee Hilt; Ravindranath Droopad, both of Chandler; William Jay Ooms, Prescott, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 92 days.

(21) Appl. No.: 09/669,602

(22) Filed: Sep. 26, 2000

(51) Int. Cl.$^7$ ................................................. G02B 6/10
(52) U.S. Cl. ........................ 385/131; 385/129; 385/130
(58) Field of Search ................................ 385/131, 130, 385/132, 129, 124, 125, 126, 127, 123, 14

(56) References Cited

U.S. PATENT DOCUMENTS 3,670,213 A   6/1972   Nakawaga et al.
4,242,595 A   12/1980  Lehovec (List continued on next page.)

FOREIGN PATENT DOCUMENTS

| DE | 197 12 496 | 10/1997 |
|----|-----------|---------|
| EP | 0 581 239 | 2/1994 |
| EP | 1 109 212 | 6/2001 |
| JP | 52 135684 | 11/1977 |
| JP | 60-210018 | 10/1985 |
| JP | 60-212018 | 10/1985 |
| JP | 64-52329 | 2/1989 |
| JP | 2051220 | 2/1990 |
| JP | 812494 | 1/1996 |
| JP | 10-256154 | 9/1998 |
| JP | 10-303396 | 11/1998 |
| JP | 11135614 | 5/1999 |
| JP | 2 000 1645 | 6/2000 |
| WO | WO 92/10875 | 6/1992 |

OTHER PUBLICATIONS

"Formation of Si Epi./MgO–Al$_2$O$_3$ Epi./SiO$_3$/Si and Its Epitaxial Film Quality," Masao Mikami et al., Fundamental Research Laboratories and Microelectronics Laboratories, pp. 31–34.

"An Epitaxial Si/Insulator/Si Structure Prepared by Vacuum Deposition of CaF$_2$ and Silicon," T. Asano et al., Graduate School of Science and Engineering, Tokyo Institute of Technology, pp. 143–151.

"Reaction and Regrowth Control of CeO$_2$ on Si(111) Surface for the Silicon–On–Insulator Structure," T. Chikyow et al., Appl. Phys. Lett. 65(8), Aug. 22, 1994, pp. 1030–1032.

"Epitaxial Growth of CeO$_2$(100) Films on Si(100) Substrates by Dual Ion Beams Reactive Sputtering," J.F. Kang et al., Solid State Communications, vol. 108, No. 4, pp. 225–227.

(List continued on next page.)

Primary Examiner—Hung Xuan Dang
(74) Attorney, Agent, or Firm—Oblon, Spivak, McClelland, Maier & Neustadt, P.C.

(57) ABSTRACT

High quality epitaxial layers of oxide can be grown overlying large silicon wafers by first growing an accommodating buffer layer on a silicon wafer. The accommodating buffer layer is a layer of monocrystalline oxide spaced apart from the silicon wafer by an amorphous interface layer of silicon oxide. The amorphous intermediate layer dissipates strain and permits the growth of a high quality monocrystalline oxide accommodating buffer layer. Any lattice mismatch between the accommodating buffer layer and the underlying silicon substrate is taken care of by the amorphous intermediate layer. Waveguides may be formed of high quality monocrystalline material atop the monocrystalline buffer layer. The waveguides can suitably be formed to modulate the wave. Monolithic integration of oxide based electro-optic devices with III-V based photonics and Si circuitry is fully realized.

45 Claims, 2 Drawing Sheets

U.S. PATENT DOCUMENTS

| | | |
|---|---|---|
| 4,289,920 A | 9/1981 | Hovel |
| 4,424,589 A | 1/1984 | Thomas et al. |
| 4,459,325 A | 7/1984 | Nozawa et al. |
| 4,482,422 A | 11/1984 | McGinn et al. |
| 4,748,485 A | 5/1988 | Vasudev |
| 4,773,063 A | 9/1988 | Hunsperger et al. |
| 4,841,775 A | 6/1989 | Ikeda et al. |
| 4,845,044 A | 7/1989 | Ariyoshi et al. |
| 4,882,300 A | 11/1989 | Inoue et al. ................ 437/236 |
| 4,901,133 A | 2/1990 | Curran et al. |
| 4,984,043 A | 1/1991 | Vinal |
| 4,999,842 A | 3/1991 | Huang et al. ................ 372/45 |
| 5,051,790 A | 9/1991 | Hammer |
| 5,055,445 A | 10/1991 | Belt et al. |
| 5,067,809 A | 11/1991 | Tsubota |
| 5,073,981 A | 12/1991 | Giles et al. |
| 5,081,519 A | 1/1992 | Nishimura et al. |
| 5,140,651 A | 8/1992 | Soref et al. |
| 5,143,854 A | 9/1992 | Pirrung et al. |
| 5,155,658 A | 10/1992 | Inam et al. ................ 361/321 |
| 5,185,589 A | 2/1993 | Krishnaswamy et al. |
| 5,227,196 A | 7/1993 | Itoh |
| 5,248,564 A | 9/1993 | Ramesh ................ 428/688 |
| 5,270,298 A | 12/1993 | Ramesh ................ 505/1 |
| 5,281,834 A | 1/1994 | Cambou et al. |
| 5,310,707 A | 5/1994 | Oishi et al. ................ 501/126 |
| 5,326,721 A | 7/1994 | Summerfelt ................ 437/131 |
| 5,352,926 A | 10/1994 | Andrews |
| 5,356,509 A | 10/1994 | Terranova et al. |
| 5,394,489 A | 2/1995 | Koch |
| 5,405,802 A | 4/1995 | Yamagata et al. |
| 5,406,202 A | 4/1995 | Mehrgardt et al. |
| 5,418,389 A | 5/1995 | Watanabe ................ 257/295 |
| 5,441,577 A | 8/1995 | Sasaki et al. |
| 5,466,631 A | 11/1995 | Ichikawa et al. |
| 5,473,047 A | 12/1995 | Shi |
| 5,486,406 A | 1/1996 | Shi |
| 5,492,859 A | 2/1996 | Sakaguchi et al. |
| 5,504,035 A | 4/1996 | Rostoker et al. |
| 5,504,183 A | 4/1996 | Shi |
| 5,511,238 A | 4/1996 | Bayraktaroglu |
| 5,514,904 A | 5/1996 | Onga et al. |
| 5,528,057 A | 6/1996 | Yanagase et al. |
| 5,528,067 A | 6/1996 | Farb et al. |
| 5,549,977 A | 8/1996 | Jin et al. |
| 5,552,547 A | 9/1996 | Shi |
| 5,553,089 A | 9/1996 | Seki et al. |
| 5,572,052 A | 11/1996 | Kashihara et al. |
| 5,596,205 A | 1/1997 | Reedy et al. |
| 5,602,418 A | 2/1997 | Imai et al. |
| 5,610,744 A | 3/1997 | Ho et al. |
| 5,659,180 A | 8/1997 | Shen et al. |
| 5,670,800 A | 9/1997 | Nakao et al. |
| 5,674,366 A | 10/1997 | Hayashi et al. ........ 204/298.09 |
| 5,679,965 A | 10/1997 | Schetzina |
| 5,689,123 A | 11/1997 | Major et al. |
| 5,731,220 A | 3/1998 | Tsu et al. ................ 437/60 |
| 5,754,319 A | 5/1998 | Van De Voorde et al. |
| 5,777,350 A | 7/1998 | Nakamura et al. |
| 5,789,845 A | 8/1998 | Wadaka et al. |
| 5,792,679 A | 8/1998 | Nakato |
| 5,801,072 A | 9/1998 | Barber |
| 5,801,105 A | 9/1998 | Yano et al. ................ 438/785 |
| 5,825,055 A | 10/1998 | Summerfelt |
| 5,827,755 A | 10/1998 | Yonchara et al. |
| 5,828,080 A | 10/1998 | Yano et al. ................ 257/43 |
| 5,833,603 A | 11/1998 | Kovacs et al. |
| 5,863,326 A | 1/1999 | Nause et al. |
| 5,872,493 A | 2/1999 | Ella |
| 5,874,860 A | 2/1999 | Brunel et al. ................ 330/285 |
| 5,883,564 A | 3/1999 | Partin |
| 5,907,792 A | 5/1999 | Droopad et al. |
| 5,937,274 A | 8/1999 | Kondow et al. |
| 5,959,879 A | 9/1999 | Koo |
| 5,987,011 A | 11/1999 | Toh |
| 6,002,375 A | 12/1999 | Corman et al. ............. 343/853 |
| 6,011,646 A | 1/2000 | Mirkarimi et al. |
| 6,022,140 A | 2/2000 | Fraden et al. |
| 6,023,082 A | 2/2000 | McKee et al. |
| 6,049,702 A | 4/2000 | Tham et al. |
| 6,055,179 A | 4/2000 | Koganei et al. ............. 365/158 |
| 6,078,717 A | 6/2000 | Nashimoto et al. |
| 6,107,721 A | 8/2000 | Lakin |
| 6,108,125 A | 8/2000 | Yano |
| 6,108,464 A * | 8/2000 | Foresi et al. ................ 385/131 |
| 6,150,239 A | 11/2000 | Goesele et al. |
| 6,153,010 A | 11/2000 | Kiyoku et al. |
| 6,175,497 B1 | 1/2001 | Tseng et al. |
| 6,175,555 B1 | 1/2001 | Hoole |
| 6,184,044 B1 | 2/2001 | Sone et al. |
| 6,204,737 B1 | 3/2001 | Ella |
| 6,224,669 B1 | 5/2001 | Yi et al. |
| 6,229,159 B1 | 5/2001 | Suzuki |
| 6,239,449 B1 | 5/2001 | Fafard et al. |
| 6,241,821 B1 | 6/2001 | Yu et al. |
| 6,242,686 B1 | 6/2001 | Kishimoto et al. |
| 6,248,459 B1 | 6/2001 | Wang et al. |
| 6,252,261 B1 | 6/2001 | Usui et al. |
| 6,255,198 B1 | 7/2001 | Linthicum et al. |
| 6,291,319 B1 | 9/2001 | Yu et al. |
| 6,313,486 B1 | 11/2001 | Kencke et al. |
| 6,316,785 B1 | 11/2001 | Nunoue et al. |
| 6,316,832 B1 | 11/2001 | Tsuzuki et al. |
| 6,343,171 B1 | 1/2002 | Yoshimura et al. |
| 6,362,017 B1 | 3/2002 | Manabe et al. |
| 2001/0013313 A1 | 8/2001 | Droopad et al. |

OTHER PUBLICATIONS

"Vertical–Cavity Surface–Emitting Lasers Come of Age," Robert A. Morgan et al., SPIE, vol. 2683, pp. 18–29.

"Technical Analysis of Qualcomm QCP–800 Portable Cellular Phone(Transmitter Circuitry)," Talus Corporation, Qualcomm QCP–800 Technical Analysis Report, Dec. 10, 1996, pp. 5–8.

"Optimizing GMR Spin Valves: The Outlook for Improved Properties", W. F. Englhoff et al., 1998 Int'l NonVolatile Memory Technology Conference, pp. 34–37.

"Processing and Performance of Piezoelectric Films", Y. Wang et al., Univ. of MD, Wilcoxon Research Co., and Motorola Labs.

"Nonlinear acoustoelectric interactions in GaAs/LiNbO$_3$ structures", M. Rotter et al., 1999 American Institute of Physics, pp. 965–967.

"Surface acoustic wave propagation on lead zirconate titanate thin films", K. Sreenivas et al., App. Phys. Lett. 52(9), Feb. 29, 1988, pp. 709–711.

"Single Chip fused hybrids for acousto–electric and acousto–optic applications", M. Rotter et al., 1997 American Institute of Physics, pp. 2097–2099.

"Surface Acoustic Wave Propagation in PZT/YBCO/SrTiO$_3$ and PbTi O$_3$/YBCO/SrTiO$_3$ Epitaxial Heterostructures", Dept. of Physics & Astrophysics, Univ. of Delhi, pp. 275–283.

"Ferroelectric Field Effect Transistor Based on Epitaxial Perovskite Heterostructure", S. Mathews et al., American Association for the Advancement of Science, 1997, pp. 238–240.

Kevin J. Chen et al; "A Novel Ultrafast Functional Device: Resonant Tunneling High Electron Mobility Transistor"; Electron Devices Meetingk 1996; IEEE Hong Kong; Jun. 29, 1996; pp. 60–63, XP010210167.

Wenhua Zhu et al.; "Molecular Beam Epitaxy of GaAs on Si–on–Insulator"; 320 Applied Physics Letters 59(1991) Jul. 8 No. 2; pp. 210–212.

Umesh K. Mishra et al; "Oxide Based Compound Semiconductor Electronics"; Electron Devices Meeting; 1997; Technical Digest, International; Washington, D.C.; 7–10 Dec. 1997; pp. 545–548.

J.M. Daughton et al.; "Applications of Spin Dependent Transport Materials"; J. Phys. D. Appl. Phys. 32(1999) R169–R177.

Wei Zhang et al; "Stress Effect and Enhanced Magnetoresistance in $La_{0.67}Ca_{0.33}MnO_{3\delta}$ Films"; Physical Review, B. Condensed Matter; American Institute of Physics; vol. 58, No. 21, Part 1; Dec. 1, 1998; pp. 14143–14146.

Q.–Y. Tong et al; "IOS–a new type of materials combination for system–on–a chip preparation"; 1999 IEEE International SOI Conference, Oct. 1999; pp. 104–105.

T. Kanniainen et al.; "Growth of Dielectric 1hfo2/Ta2O5 Thin Film Nanolaminate Capacitors By Atomic Layer Epitaxy"; Electrochemical Society Proceedings, U.S. Electrochemical Society; Pennington, N.J.; Aug. 31, 1997; pp. 36–46.

Myung Bok Lee; "Formation and Characterization of Eptiaxial $TiO_2$ and $BaTiO_3/TiO_2$ Films on Si–Substrate"; Japan Journal Applied Physics Letters; vol. 34; 1995; pp. 808–811.

Stephen A. Mass; "Microwave Mixers"; Second Edition; 2 pp.

Douglas J. Hamilton et al.; "Basic Integrated Circuit Engineering"; pp. 2; 1975.

Wei Zhang et al.; "Enhanced Magnetoresistance in La–Ca–Mn–O Films on Si Substrates Using $YbaCuO/CeO_2$ Heterostructures"; Physica C; vol. 282–287, No. 2003; Aug. 1, 1997; pp. 1231–1232.

Shogo Imada et al; "Epitaxial Growth of Ferroelectric $YmnO_3$ Thin Films on Si (111) Substrates by Molecular Beam Epitaxy"; Jpn. J. Appl. Phys. vol. 37 (1998); pp. 6497–6501; Part 1, No. 12A, Dec. 1998.

C. Martinez; "Epitaxial Metallic Nanostructures on GaAs"; Surface Science; vol. 482–485; pp. 910–915; 2001.

Wen–Ching Shih et al.; "Theoretical Investigation of the SAW Properties of Ferroelectric Film Composite Structures"; IEEE Transactions of Ultrasonics, Ferroelectrnics, and Frequency Control; vol. 45, No. 2; Mar. 1998; pp. 305–316.

Zhu Dazhong et al.; "Design of $ZnO/SiO_2/Si$ Monolithic Integrated Programmable SAW Filter"; Proceedings of Fifth International Conference on Solid–State and Integrated Circuit Technology; 21–23; Oct. 1998; pp. 826–829.

Kirk–Othmer Encyclopedia of Chemical Technology; Fourth Edition, vol. 12; Fuel Resources to Heat Stabilizers; A Wiley–Interscience Publication; John Wiley & Sons.

John W. Goodman et al; "Optical Interconnections For VLSI Systems"; Proceedings of the IEEE, vol. 72, No. 7 Jul. 1984.

Fathimulla et al.; "Monolithic Integration of InGaAs/InAlAs MODFETs and RTDs on InP–bonded–to Si Substrate"; Fourth International Conference on Indium Phosphide and Related Materials, Newport, RI, USA; Apr. 21–24, 1992; pp. 167–170; XP000341253; IEEE, New York, NY, USA; ISBN: 0–7803–0522–1.

Hideaki Adachi et al.; "Sputtering Preparation of Ferroelectric PLZT Thin Films and Their Optical Applications"; IEEE Transactions of Ultrasonics, Ferroelectrics and Frequency Control, vol. 38, No. 6, Nov. 1991.

Pierret, R.F.; "1/J–FET and MESFET"; Field Effect Devices; MA, Addison–Wesley; 1990; pp. 9–22.

M. Schreiter, et al.; "Sputtering of Self–Polarized PZT Films for IR–Detector Arrays"; 1998 IEEE; pp. 181–185.

A.J. Moulson et al.; "Electroceramics Materials Properties Applications"; Chapman & Hall; pp. 366–369.

P.A. Langjahr et al.; "Epitaxial Growth and Structure of Cubic and Pseudocubic Perovskite Films on Perovskite Substrates"; Mat. Res. Soc. Symp. Proc., vol. 401; 1995 Materials Research Society; pp. 109–114.

Wang et al.; "Depletion–Mode GaAs MOSFETs with Negligible Drain Current Drift and Hysteresis"; Electron Devices Meeting, 1998, IEDM '98 Technical Digest; pp. 67–70.

Ben G. Streetman; "Solid State Electronic Devices"; 1990, Prentice Hall; Third Edition; pp. 320–322.

A.Y. Wu et al.; "Highly Oriented $(Pb,La)(Zr,Ti)O_3$ Thin Films on Amorphous Substrates"; IEEE, 1992; pp. 301–304.

Timothy E. Glassman et al.; "Evidence for Cooperative Oxidation of MoCVD Precursors Used in $Ba_xSr_{1-x}TiO_3$ Film Growth"; Mat. Res. Soc. Symp. Proc. vol. 446, 1997 Materials Research Society; pp. 321–326.

* cited by examiner

ELECTRO-OPTIC STRUCTURE AND PROCESS FOR FABRICATING SAME

FIELD OF THE INVENTION

This invention relates generally to electro-optic structures and devices and to a method for their fabrication, and more specifically to an improved electro-optic structure and to a method for monolithically integrating the electro-optic structure with silicon devices and circuits.

BACKGROUND OF THE INVENTION

In general, communication systems transmit information from one place to another. Information is often carried by an electromagnetic carrier wave whose frequency can vary from a few megahertz (MHz) to several hundred terahertz (THz).

Typically, optical communication systems use high carrier frequencies (e.g., 100 THz) in the visible or near-infrared region of the electromagnetic spectrum.

Waveguides are used to control the direction of waves such as lightwaves and other electromagnetic waves. In the simplest form, a waveguide includes a core surrounded at least partially by a cladding whose refractive index is lower than that of the core. The wave travels through the core reflecting off of the cladding. If the cladding has a higher refractive index than the core, the wave will simply be absorbed into the cladding and will not travel through the core.

Strontium barium niobate (SBN) is strongly photorefractive material and in recent years has received a great deal of attention due to its potential applications in electro-optics, holographic storage, spatial light modulators, pyroelectric detectors, surface acoustic wave devices and beam steering. SBN waveguides show a high compatibility with integrated optical systems and other miniaturized devices.

The vast majority of semiconductor discrete devices and integrated circuits are fabricated from silicon, at least in part because of the availability of inexpensive, high quality monocrystalline silicon substrates.

The combination of the useful properties of SBN with semiconductor circuits is also desirable. If SBN waveguiding films could be fabricated on silicon substrates, this would help to bridge the gap between integrated optics and microelectronics. If a waveguiding film of high quality monocrystalline material could be realized on a bulk wafer such as a silicon wafer, an integrated device structure could be achieved that took advantage of the best properties of both the silicon and the waveguiding material. In addition, the combination could lead to new electro-optic and microelectronic devices, improve existing devices and reduce their fabrication costs.

Various attempts have been proposed to integrate SBN films on bulk substrates.

For example, the combination of SBN film on a MgO (magnesium oxide) substrate showed some favor due to the lower refractive index of MgO which resulted in a refractive index difference of 0.5. However, silicon substrates are much more desirable for integration purposes.

Another attempt proposed by X L Guo et al., "Pulsed Laser Deposition of $Sr_xBa_{1-x}Nb_2O_6$/MgO Bilayered Films on Si Wafer in Waveguide Form," *J Phys. D: Appl. Phys.* 29, 1996, pp. 1632–35, teaches a method of fabrication of SBN/MgO bilayered films on p-type silicon wafers. The bilayered film shows a polycrystalline growth of SBN films and highly textured growth of MgO buffer layers. However, as X L Guo et al. admits, the resulting polycrystalline structure is not as desirable as a monocrystalline structure and therefore, further efforts shall be made to improve the crystallinity of the SBN film.

Accordingly, a need exists for an electro-optic structure having high quality monocrystalline characteristics. In particular, a need exists for an electro-optic structure which is monolithically integrated with silicon-based circuitry wherein the structure is of high quality monocrystalline material.

BRIEF DESCRIPTION OF THE DRAWINGS

The present invention is illustrated by way of example and not limitation in the accompanying figures, in which like references indicate similar elements, and in which.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE DRAWINGS

Figure 1:
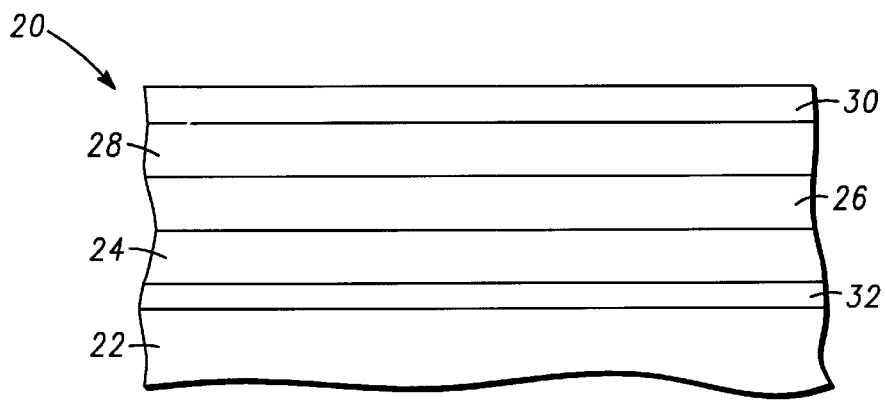
FIGS. 1, 3 and 5 illustrate schematically, in cross section, waveguide structures in accordance with various embodiments of the invention.

FIG. 1 illustrates schematically, in cross section, a portion of a waveguide structure 20 in accordance with an embodiment of the invention. Structure 20 includes a monocrystalline substrate 22, an accommodating buffer layer 24 comprising a monocrystalline material, a bottom cladding layer 26 of monocrystalline material, a core 28 of monocrystalline material, and a top cladding layer 30 of monocrystalline material. In this context, the term "monocrystalline" shall have the meaning commonly used within the semiconductor industry. The term shall refer to materials that are a single crystal or that are substantially a single crystal and shall include those materials having a relatively small number of defects such as dislocations and the like as are commonly found in substrates of silicon or germanium or mixtures of silicon and germanium and epitaxial layers of such materials commonly found in the semiconductor industry.

In accordance with one embodiment of the invention, structure 20 also includes an amorphous intermediate layer 32 positioned between substrate 22 and accommodating buffer layer 24. The amorphous intermediate layer helps to relieve the strain in the accommodating buffer layer and by doing so, aids in the growth of a high crystalline quality accommodating buffer layer.

Substrate 22, in accordance with an embodiment of the invention, is a monocrystalline semiconductor wafer, preferably of large diameter. The wafer can be of a material from Group IV of the periodic table, and preferably a material from Group IVA. Examples of Group IV semiconductor materials include silicon, germanium, mixed silicon and germanium, mixed silicon and carbon, mixed silicon, germanium and carbon, and the like. Preferably substrate 22 is a wafer containing silicon or germanium, and most preferably is a high quality monocrystalline silicon wafer as used in the semiconductor industry having a diameter of about 200–300 mm.

Accommodating buffer layer 24 is preferably a monocrystalline oxide material selected for its crystalline compatibility with the underlying substrate and with the overlying compound semiconductor material. For example, the material could be an oxide having a lattice structure substantially matched to the substrate and to the subsequently applied cladding material. Materials that are suitable for the accommodating buffer layer include metal oxides such as the alkaline earth metal titanates and may typically include at least two different metallic elements. In some specific applications, the metal oxides may include three or more different metallic elements.

The cladding and core material of layers 26, 28 and 30 can be selected, as needed for a particular waveguide structure. To obtain total or at least substantially total internal reflection, core 28 is formed of a material having a different index of refraction than the material used to form top and bottom cladding layers 30 and 26. More particularly, the index of refraction of core 28 is greater than the index of refraction of top and bottom cladding layers 30 and 26, which may suitably be formed of the same material. In accordance with an exemplary embodiment, the material selected for core 28 has an index of refraction of $n_1$ and the material selected for top and bottom cladding layers 30 and 26 has an index of refraction of $n_2$ and $n_3$ respectively, where $n_1 > n_2$ and $n_1 > n_3$.

In accordance with one embodiment of the invention, core layer 28 and cladding layers 26 and 30 are highly photoreactive materials, such as strontium barium niobate (SBN). The thickness of each SBN layer is dependent upon the particular wavelength of energy transmitted. In general, optical waveguides operate in the visible to near infrared region of the electromagnetic spectrum. In this embodiment, a bottom cladding layer 26 having a refractive index $n_3$ is deposited atop buffer layer 24. Cladding layer 26 may be SBN:60, where 60 denotes the ratio of strontium to barium, and $n_3$ may be equal to 2.33. Core layer 28 is deposited atop the bottom cladding layer and preferably has an refractive index $n_1$ higher than $n_3$. Core layer 28 may be SBN:75 and $n_1$ may be equal to 2.35. Top cladding layer 30 may then be deposited atop core layer 28. In one particular aspect of this embodiment, top cladding layer 30 is the same material as bottom cladding layer 26 (i.e., SBN:60, $n_1$=2.33). However, as will discussed in more detail below, it is not necessary to deposit an additional cladding layer atop the core if the surrounding medium has a lower refractive index than the core (e.g., air which has a refractive index equal to 1).

In yet another embodiment of the invention, cladding layers 26 and 30 are magnesium oxide (MgO) having a refractive index of 1.78 ($n_2$ and $n_3$ equal 1.78). The core layer 28 is SBN:50 to SBN:75 and preferably SBN:75 due to the higher refractive index of SBN:75. However, SBN:50 to SBN:75 is suitable for this embodiment as well as the previously discussed embodiment.

This embodiment, as well as the previously discussed embodiment, describe a symmetric configuration where the cladding layers are "symetric" around the core.

However, it should be understood that all configurations, symetric and antisymetric are considered within the scope of the present invention. As will be discussed in further detail below, antisymetric configurations include cladding materials which are not of the same refractive index. For example,
the bottom cladding layer may have a refractive index which is greater or lesser than the top cladding layer, however in any event, the core refractive index is generally higher than either cladding layer.

In accordance with one embodiment of the invention, amorphous intermediate layer 32 is grown on substrate 22 at the interface between substrate 22 and the growing accommodating buffer layer. Amorphous intermediate layer 32 is preferably an oxide formed by the oxidation of substrate 22, and more preferably is composed of a silicon oxide ($SiO_x$) during the growth of layer 24. The thickness of layer 32 is sufficient to relieve strain attributed to mismatches between the lattice constants of substrate 22 and accommodating buffer layer 24 (typically in the range of approximately 0.5–5.0 nm). As used herein, lattice constant refers to the distance between atoms of a cell measured in the plane of the surface. If such strain is not relieved by the amorphous intermediate layer, the strain may cause defects in the crystalline structure of the accommodating buffer layer. Defects in the crystalline structure of the accommodating buffer layer, in turn, would make it difficult to achieve a high quality crystalline structure in monocrystalline layers 26, 28 and 30

In accordance with one embodiment of the invention, accommodating buffer layer 24 is a monocrystalline layer of $Sr_zBa_{1-z}TiO_3$ where z ranges from 0 to 1 and the amorphous intermediate layer 32 is a layer of silicon oxide ($SiO_x$) formed at the interface between the silicon substrate and the accommodating buffer layer. The value of z may be selected to obtain one or more lattice constants closely matched to corresponding lattice constants of the subsequently formed cladding layer 26. The accommodating buffer layer can have a thickness of a few monolayers to hundreds of angstroms (100 Å). In general, it is desired to have an accommodating buffer layer thick enough to isolate the single crystal oxide layer from the substrate to obtain the desired electrical and optical properties. Layers thicker than 100 nm usually provide little additional benefit while increasing cost unnecessarily; however, thicker layers may be fabricated if needed. In this embodiment, the amorphous intermnediate layer of silicon oxide can have a thickness of about 0.5–5 nm, and preferably a thickness of about 1.5–2.5 nm.

Substrate 22 is a monocrystalline substrate such as a monocrystalline silicon substrate. The crystalline structure of the monocrystalline substrate is characterized by a lattice constant and by a lattice orientation. In similar manner, accommodating buffer layer 24 is also a monocrystalline material and the lattice of that monocrystalline material is characterized by a lattice constant and a crystal orientation. The lattice constants of the accommodating buffer layer and the monocrystalline substrate must be closely matched or, alternatively, must be such that upon rotation of one crystal orientation with respect to the other crystal orientation, a substantial match in lattice constants is achieved. In this context the terms "substantially equal" and "substantially matched" mean that there is sufficient similarity between the lattice constants to permit the growth of a high quality crystalline layer on the underlying layer.

Figure 2:
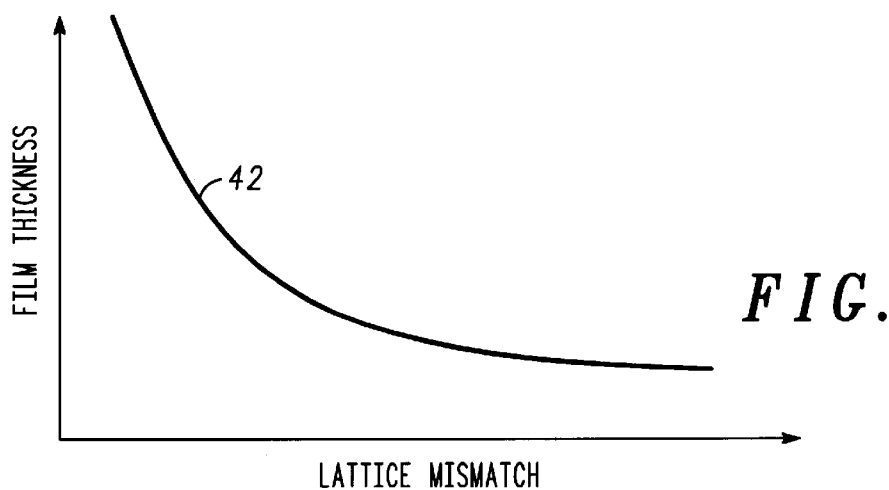
FIG. 2 illustrates graphically the relationship between maximum attainable film thickness and lattice mismatch between a host crystal and a grown crystalline overlayer.

FIG. 2 illustrates graphically the relationship of the achievable thickness of a grown crystal layer of high crystalline quality as a function of the mismatch between the lattice constants of the host crystal and the grown crystal. Curve 42 illustrates the boundary of high crystalline quality material. The area to the right of curve 42 represents layers that have a large number of defects. With no lattice mismatch, it is theoretically possible to grow an infinitely thick, high quality epitaxial layer on the host crystal. As the mismatch in lattice constants increases, the thickness of achievable, high quality crystalline layer decreases rapidly. As a reference point, for example, if the lattice constants between the host crystal and the grown layer are mismatched by more than about 2%, monocrystalline epitaxial layers in excess of about 20 nm cannot be achieved.

In accordance with one embodiment of the invention, substrate 22 is a (100) or (111) oriented monocrystalline silicon wafer and accommodating buffer layer 24 is a layer of strontium barium titanate. Substantial matching of lattice constants between these two materials is achieved by rotating the crystal orientation of the titanate material by 45° with respect to the crystal orientation of the silicon substrate wafer. The inclusion in the structure of amorphous intermediate layer 32, a silicon oxide layer in this example, if it is of sufficient thickness, serves to reduce strain in the titanate monocrystalline layer that might result from any mismatch in the lattice constants of the host silicon wafer and the grown titanate layer. As a result, in accordance with an embodiment of the invention, a high quality, thick, monocrystalline titanate layer is achievable.

Referring again to FIG. 1, cladding layer 26 is a layer of epitaxially grown monocrystalline material and that crystalline material is also characterized by a crystal lattice constant and a crystal orientation. In accordance with one embodiment of the invention; the lattice constant of layer 26 differs from the lattice constant of substrate 22. To achieve high crystalline quality in this epitaxially grown monocrystalline layer 26, the accommodating buffer layer 24 must be of high crystalline quality. In addition, in order to achieve high crystalline quality in layer 26, substantial matching between the crystal lattice constant of the host crystal, in this case, the monocrystalline accommodating buffer layer, and the grown crystal is desired. With properly selected materials this substantial matching of lattice constants is achieved as a result of rotation of the crystal orientation of the grown crystal with respect to the orientation of the host crystal. The following example illustrates a process, in accordance with one embodiment of the invention, for fabricating a waveguide structure such as the structure depicted in FIG. 1. The process starts by providing a monocrystalline semiconductor substrate comprising silicon or germanium. In accordance with a preferred embodiment of the invention, the semiconductor substrate is a silicon wafer having a (100) orientation. The substrate is preferably oriented on axis or, at most, about 0.5° off axis.

At least a portion of the semiconductor substrate has a bare surface, although other portions of the substrate, as described below, may encompass other structures. The term "bare" in this context means that the surface in the portion of the substrate has been cleaned to remove any oxides, contaminants, or other foreign material. As is well known, bare silicon is highly reactive and readily forms a native oxide. The term "bare" is intended to encompass such a native oxide. A thin silicon oxide may also be intentionally grown on the semiconductor substrate, although such a grown oxide is not essential to the process in accordance with the invention. In order to epitaxially grow a monocrystalline oxide layer overlying the monocrystalline substrate, the native oxide layer must first be removed to expose the crystalline structure of the underlying substrate. The following process is preferably carried out by molecular beam epitaxy (MBE), although other epitaxial processes may also be used in accordance with the present invention. The native oxide can be removed by first thermally depositing a thin layer of strontium, barium, a combination of strontium and barium, or other alkali earth metals or combinations of alkali earth metals in an MBE apparatus. In the case where strontium is used, the substrate is then heated to a temperature of about 750° C. to cause the strontium to react with the native silicon oxide layer. The strontium serves to reduce the silicon oxide to leave a silicon oxide-free surface. The resultant surface, which exhibits an ordered 2×1 structure, includes strontium, oxygen, and silicon. The ordered 2×1 structure forms a template for the ordered growth of an overlying layer of a monocrystalline oxide. The template provides the necessary chemical and physical properties to nucleate the crystalline growth of an overlying layer.

In accordance with an alternate embodiment of the invention, the native silicon oxide can be converted and the substrate surface can be prepared for the growth of a monocrystalline oxide layer by depositing an alkali earth metal oxide, such as strontium oxide, strontium barium oxide, or barium oxide, onto the substrate surface by MBE at a low temperature and by subsequently heating the structure to a temperature of about 750° C. At this temperature a solid state reaction takes place between the strontium oxide and the native silicon oxide causing the reduction of the native silicon oxide and leaving an ordered 2×1 structure with strontium, oxygen, and silicon remaining on the substrate surface. Again, this forms a template for the subsequent growth of an ordered monocrystalline oxide layer.

Following the removal of the silicon oxide from the surface of the substrate, in accordance with one embodiment of the invention, the substrate is cooled to a temperature in the range of about 200–800° C. and a layer of strontium titanate is grown on the template layer by molecular beam epitaxy. The MBE process is initiated by opening shutters in the MBE apparatus to expose strontium, titanium and oxygen sources. The ratio of strontium and titanium is approximately 1:1. The partial pressure of oxygen is initially set at a minimum value to grow stochiometric strontium titanate at a growth rate of about 0.3–0.5 nm per minute. After initiating growth of the strontium titanate, the partial pressure of oxygen is increased above the initial minimum value. The overpressure of oxygen causes the growth of an amorphous silicon oxide layer at the interface between the underlying substrate and the growing strontium titanate layer. The growth of the silicon oxide layer results from the diffusion of oxygen through the growing strontium titanate layer to the interface where the oxygen reacts with silicon at the surface of the underlying substrate. The strontium titanate grows as an ordered monocrystal with the crystalline orientation rotated by 45° with respect to the ordered 2×1 crystalline structure of the underlying substrate. Strain that otherwise might exist in the strontium titanate layer because of the small mismatch in lattice constant between the silicon substrate and the growing crystal is relieved in the amorphous silicon oxide intermediate layer.

After the strontium titanate layer has been grown to the desired thickness, the monocrystalline strontium titanate is capped by a template layer that is conducive to the subsequent growth of an epitaxial layer of a desired cladding material. For the subsequent growth of a layer of SBN, the MBE growth of the strontium titanate monocrystalline layer can be capped by terminating the growth by depositing 1–2 atomic layers of material to form a Sr—O bond. Alternatively, a Ba—O bond may be formed if the accommodating buffer layer is barium titantate.

Once the monocrystalline accommodating buffer layer 24 is formed, a monocrystalline waveguide can be formed. In one embodiment, a layer of SBN:60 is deposited atop layer 24 by metal organic chemical vapor deposition (MOCVD)

and preferably is axis orientated for lattice matching. The core layer 28 of preferably SBN:75 is deposited atop the bottom cladding layer 26 by the same process. In a symetric configuration, the core is surrounded by the same cladding material, in which case cladding layer 30 of SBN:60 may be deposited atop the core layer. The core and cladding layers thickness varies according to the wavelength of light introduced into the waveguide (core).

Figure 3:
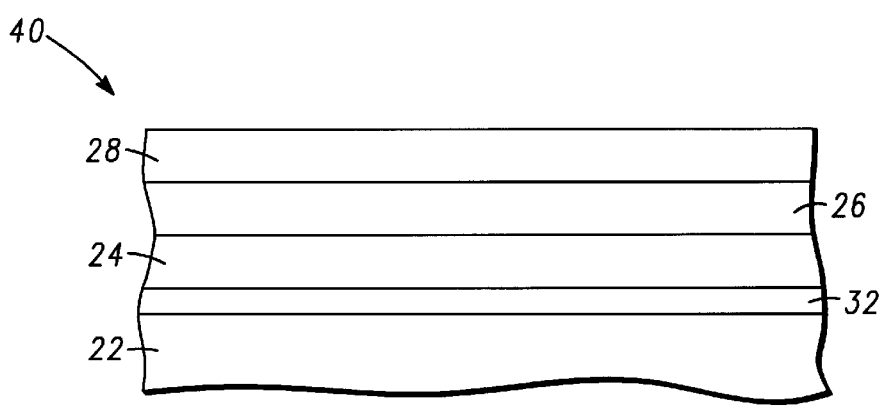

FIG. 3 illustrates, in cross section, a portion of a waveguide structure 40 in accordance with a further embodiment of the invention. Structure 40 is similar to the previously described waveguide structure 20, except the top cladding layer is omitted. As previously discussed, it is preferred to surround the core with a material or substance having a lower refractive index than the core. Structure 40 includes a core 28 having a refractive index $n_1$ and a bottom cladding 26 having a refractive index $n_3$, where $n_1 > n_3$. In antisymetric systems, the top and bottom cladding have varying refractive indices or alternatively, one of the cladding layers may be omitted entirely. The wave, e.g., lightwave, will continue to traverse through the core, with little loss, as long as the surrounding cladding or medium has a lower refractive index than the core.

In one aspect of the present embodiment, bottom cladding layer 26 has a refractive index $n_3$, core layer 28 has a refractive index $n_1$ and air abuts core layer 28, where air generally has a refractive index equal to 1 and $1 < n_1 > n_3$.

It should be appreciated that the previously described structures 20 and 40, as well as the following structures, may be patterned and etched. In particular, the core and/or cladding layers of the waveguide structure may be patterned and etched in a manner well known in the semiconductor industry. More particularly, the layers of interest in the structure may be patterned and etched to enhance wave travel, define input and output of the wave, and the like.

Figure 4:
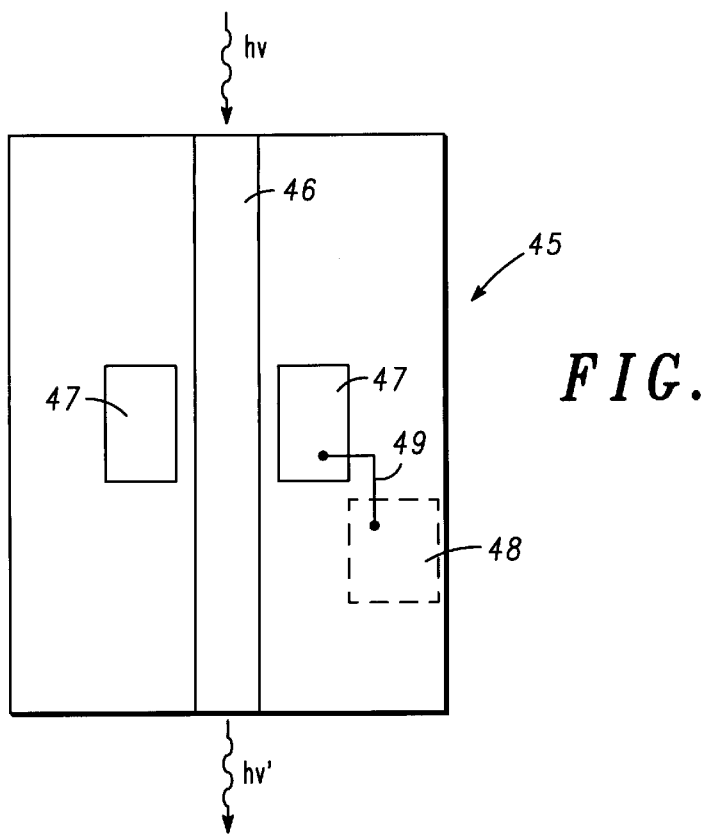
FIGS. 4 and 6 illustrate schematically in cross section a top view of waveguide structures in accordance with various embodiments of the invention.

FIG. 4 illustrates schematically, in cross section, a top view portion of a waveguide structure 45 in accordance with an embodiment of the invention. Structure 45 is similar to previously described waveguide structures 20 and 40, except that waveguide structure 45 includes additional elements to form a modulator. In particular, structure 45 includes a structure 46, including core and cladding layers, and an electrode(s) 47.

External modulators change the characteristics of the travelling wave typically by introducing an electric charge or field in an area of the core. For example, a controlled electric field results when a voltage is supplied to electrodes 47. In this example, a lighwave (illustrated as hv) may be travelling through the core by internal reflection from the surrounding cladding or air. The voltage supplied to electrode(s) 47 generates a certain electric field or charge in the path of the travelling wave. The wave characteristics change (modulate) in the presence of the electrical effects, thus changing (modulating) the travel pattern, phase or the like of the travelling wave (illustrated as hv').

In one aspect of the present embodiment, an electrical component schematically illustrated by a dashed line 48 is formed in at least a part of the silicon substrate using conventional silicon device processing techniques commonly used in the semiconductor industry. Electrical component 48 is electrically coupled to electrode(s) 47 as illustrated generally by line 49. Component 48 can be an active semiconductor component suitably configured to provide an electrical signal to electrode(s) 47, for example, an integrated circuit such as a CMOS integrated circuit. Component 48 may, in addition or in the alternative, include one or more passive components. A layer of suitable insulating material (not shown) may overlie electrical component 48 to prevent electrical shortings and the like.

Figure 5:
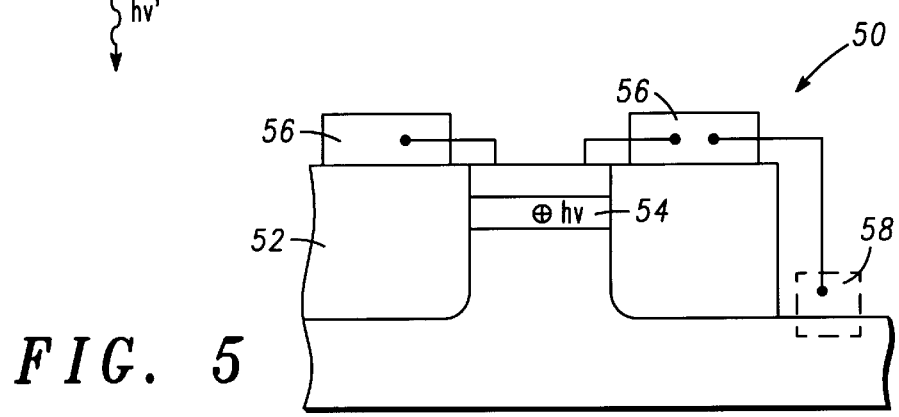

FIG. 5 illustrates schematically, in cross section, a portion of a waveguide structure 50 in accordance with a further embodiment of the invention. Structure 50 is similar to previously described structures 20 and 45. Structure 50 includes a core 54 suitable for wave travel. As depicted, structure 50 includes a top cladding layer of preferably lower refractive index than the refractive index of core 54. However, it should be appreciated that the top cladding layer may be omitted (as illustrated in FIG. 3) and a suitable medium such as air with a lower refractive index than core 54 may abut the core.

Structure 50 further includes one or more electrode(s) 56 atop a layer of dielectric material 52. In one aspect of the present embodiment, structure 50 may be formed as previously described for structures 20, 40 and 45. The layers forming structure 50 may then be etched back to expose the substrate in various areas. For example, structure 50 may be etched back to form a "mesa" comprising, among other layers, the core and cladding layers. A dielectric substance 52 can then be deposited in the areas adjacent to the remaining mesa. A suitable dielectric includes materials such as $SiO_2$ and $SiN_3$. Electrode(s) 56 can then be placed atop dielectric layer(s) 52 and electrically coupled to the mesa. In yet another aspect of the present embodiment, an electrical component 58 is electrically coupled to electrode(s) 56 to provide the electrical charge or field. Thus, monolithic integration of oxide based electro-optic devices with silicon circuitry is fully realized.

Figure 6:
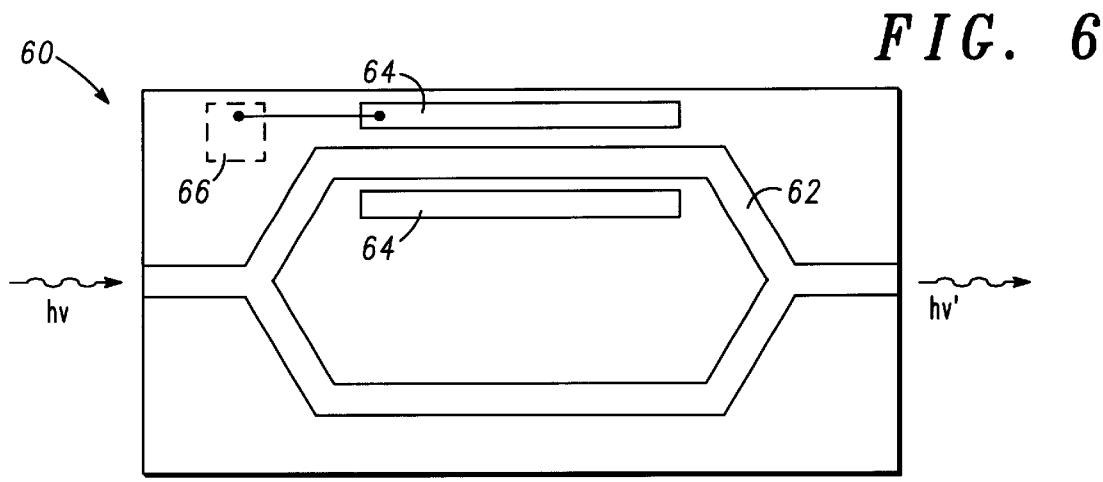

FIG. 6 illustrates schematically, in cross section, a top view of a waveguide structure 60 in accordance with yet another embodiment of the invention. Structure 60 is fabricated in any of the previously described methods and is further fabricated in a Mach-Zehnder, or the like, configuration. The Mach-Zehnder interferometer design 62 includes two arms that cause the travelling wave (illustrated as hv) to divide and continue travelling down two identical, yet distanced paths. In the absence of external voltage, the optical fields in the two arms of the Mach-Zehnder interferometer experience identical phase shifts and interfere constructively. In one arm of the interferometer, a voltage may be supplied to one or more electrode(s) 64 that may phase shift the corresponding wave (illustrated generally as "modulated" lightwave hv'). The additional phase shift can destroy the constructive nature of the interference and reduce the transmitted intensity. In particular, no light may be transmitted when the phase difference between the two arms equals $\pi$ (pi) because of destructive interference occurring in that case. As a result, the electrical "switching" properties of the modulator can control the amount of light or lack thereof. An electrical component 66, formed at least partially in the substrate of structure 60 (e.g., silicon semiconductor substrate), can be suitably coupled to electrode(s) 64 to provide the electrical signal needed for modulation.

The process described above illustrates a process for forming a waveguide structure including a silicon substrate, an overlying oxide layer, and monocrystalline core and cladding layers is conveniently described by MBE and MOCVD processes.

However, it should be appreciated that any of the above detailed processes can also be carried out by the process of chemical vapor deposition (CVD), physical vapor deposition (PVD), pulsed laser deposition (PLD), or the like.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential features or elements of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A waveguide structure comprising:

a monocrystalline semiconductor substrate;

a monocrystalline oxide layer formed overlying the substrate;

a core layer formed atop the oxide layer; and a cladding layer formed adjacent to the core layer.

2. The structure of claim 1 wherein the monocrystal line semiconductor substrate comprises silicon.

3. The structure of claim 1 wherein the oxide layer comprises an oxide selected form the group consisting of alkali earth metal titantates.

4. The structure of claim 3 wherein the oxide layer comprises $Sr_zBa_{1-z}TiO_3$ where z ranges from 0 to 1.

5. The structure of claim 1 wherein the core layer comprises monocrystalline strontium barium niobate (SBN).

6. The structure of claim 5 wherein the core layer comprises SBN:75.

7. The structure of claim 5 wherein the cladding layer comprises monocrystalline magnesium oxide (MgO).

8. The structure of claim 1 wherein the cladding layer comprises monocrystalline strontium barium niobate (SBN).

9. The structure of claim 8 wherein the cladding layer comprises SBN:60.

10. The structure of claim 1 wherein the cladding layer comprises a second cladding layer.

11. The structure of claim 10 comprising a symetric configuration.

12. The structure of claim 10 comprising an antisymetric configuration.

13. The structure of claim 1 further comprising an amorphous layer formed between the substrate and the oxide layer.

14. The structure of claim 13 wherein the amorphous layer comprises an oxide.

15. The structure of claim 14 wherein the amorphous layer comprises silicon oxide.

16. The structure of claim 1 further comprising a wave modulator.

17. A wave modulation structure comprising:

a monocrystalline semiconductor substrate;

a monocrystalline oxide layer formed overlying the substrate;

a monocrystalline core layer formed atop the oxide layer;

a monocrystalline cladding layer formed adjacent to the core layer; and an electrode in electrical communication with the core.

18. The structure of claim 17 wherein the substrate comprises silicon.

19. The structure of claim 18 further comprising an electrical device at least partially in the substrate wherein the device is electrically coupled to the electrode.

20. The structure of claim 19 wherein the device comprises a silicon-based device.

21. The structure of claim 20 wherein the device comprises a CMOS.

22. The structure of claim 17 wherein the oxide layer comprises an oxide selected form the group consisting of alkali earth metal titantates.

23. The structure of claim 22 wherein the oxide layer comprises $Sr_zBa_{1-z}TiO_3$ where z ranges from 0 to 1.

24. The structure of claim 17 comprising a symetric configuration.

25. The structure of claim 17 comprising an antisymetric configuration.

26. The structure of claim 17 further comprising an amorphous oxide layer at the interface of the monocrystalline substrate and the monocrystalline oxide layer.

27. A process for fabricating a waveguide structure comprising the steps of:

providing a monocrystalline semiconductor substrate;

forming a monocrystalline oxide layer overlying the substrate;

forming a core layer atop the oxide layer; and forming a cladding layer at least partially around the core layer.

28. The process of claim 27 wherein the step of forming a monocrystalline oxide layer comprises epitaxially growing the oxide layer by a process selected from the group consisting of molecular beam epitaxy, chemical vapor deposition, physical vapor deposition, and pulsed laser deposition.

29. The process of claim 28 wherein the step of forming a cladding layer comprises:

forming a bottom cladding layer atop the oxide layer; and forming a top cladding layer atop the core layer, whereby the cladding layers substantially surround the core layer.

30. The process of claim 29 wherein forming a top cladding layer further comprises forming a symetric structure.

31. The process of claim 27 wherein the step of forming a monocrystalline oxide layer comprises epitaxially growing a layer comprising layer comprising $Sr_zBa_{1-z}TiO_3$ where z ranges from 0 to 1.

32. The process of claim 27 further comprising the step of forming a symetric waveguide.

33. The process of claim 27 further comprising the step of forming an antisymetric waveguide.

34. The process of claim 27 wherein the step of forming a core layer comprises depositing a layer of strontium barium niobate (SBN).

35. The process of claim 34 wherein the step of depositing is by a process selected from the group consisting of metal organic chemical vapor deposition, pulsed laser deposition, chemical vapor deposition and molecular beam epitaxy.

36. The process of claim 34 wherein the step of forming a core layer further comprises axis orientating to lattice match the core layer and underlying layer.

37. The process of claim 27 wherein the step of forming a cladding layer comprises depositing a layer of strontium barium niobate (SBN).

38. The process of claim 27 wherein the step of forming a cladding layer comprises forming a monocrystalline cladding layer.

39. The process of claim 27 further comprising the step of forming a wave modulator in electrical communication with the core layer.

40. The process of claim 39 wherein the step of forming a wave modulator comprises forming a Mach-Zehnder interferometer.

41. The process of claim 39 wherein the step of forming a wave modulator comprises:

etching back the layers to expose the substrate to form a mesa, wherein the mesa comprises the core and cladding layers;

depositing a dielectric material in the etched back area; and forming an electrode atop the dielectric material.

42. The process of claim 41 wherein the step of depositing a dielectric material comprises depositing one of silicon oxide or silicon nitride.

43. The process of claim 41 further comprising the steps of:

forming an electrical device at least partially in the substrate; and electrically coupling the device to the electrode.

44. The process of claim 43 wherein the step of forming comprises forming a silicon-based integrated circuit at least partially in the substrate.

45. The proces of claim 27 wherein the step of forming a core layer comprises forming a monocrystaline core layer.

* * * * *